United States Patent
Killey

(10) Patent No.: US 6,242,510 B1
(45) Date of Patent: Jun. 5, 2001

(54) LABEL ADHESIVE WITH DISPERSED REFRACTIVE PARTICLES

(75) Inventor: Edward J. Killey, Green Bay, WI (US)

(73) Assignee: Green Bay Packaging, Inc., Green Bay, WI (US)

( * ) Notice: Subject to any disclaimer, the term of this patent is extended or adjusted under 35 U.S.C. 154(b) by 0 days.

(21) Appl. No.: 09/540,688

(22) Filed: Mar. 31, 2000

Related U.S. Application Data

(60) Provisional application No. 60/127,639, filed on Apr. 2, 1999.

(51) Int. Cl.[7] .............................. C09J 9/00; B32B 33/00; B32B 25/02; C08K 9/10
(52) U.S. Cl. ................. 523/204; 524/441; 156/307.4; 156/327; 156/329; 156/331.7; 156/332; 156/334; 427/207.1; 427/208.2; 427/208.4; 427/212; 428/40.2; 428/323; 428/327; 428/328; 428/355 AC; 428/355 N; 428/355 BL
(58) Field of Search ................... 427/207.1, 208.2, 427/208.4, 212; 428/40.1, 323, 328, 343, 352, 354, 355 AC, 355 BL, 355 N, 356, 40.2; 523/204; 524/441; 156/289, 307.4, 308.2, 327, 329, 331.7, 332, 334, 338, 500, 244.01, 244.18, 244.19

(56) References Cited

U.S. PATENT DOCUMENTS 4,248,762 * 2/1981 Hornibrook et al. ................. 524/441
4,248,917 * 2/1981 Hornibrook et al. ................. 428/356
4,248,918 * 2/1981 Hornibrook et al. ................. 428/354
5,202,180 * 4/1993 Watts .................................. 428/328

* cited by examiner

Primary Examiner—Peter Szekely
(74) Attorney, Agent, or Firm—Andrus, Sceales, Starke & Sawall, LLP

(57) ABSTRACT

A pressure sensitive adhesive composition comprised of a substantially tacky polymer containing a number of prismatic or holographic platelets. When the composition is applied to a substrate, the platelets align themselves in a planar fashion parallel to the broad face of the surface on which the coating is applied. The resulting composition layer is transparent except for the platelets that refract and reflect the light striking the platelets back towards an observer. The color of the reflected light changes as the angle at which the platelets are viewed is changed. In this manner, the platelets in the coating provide an overall aesthetically pleasing appearance for the coated material that adds distinctiveness to decorative labeling, as well as to the objects on which the labeling is placed and other suitable types of laminations in which the adhesive coating may be used. Furthermore, the labeling may be used as an indication of counterfeit objects or of tampering with the object on which the labeling is placed because the platelets will either not be in an aligned position, or will shift from their aligned position within the adhesive composition when the labeling is disturbed.

32 Claims, 2 Drawing Sheets

FIG. 3
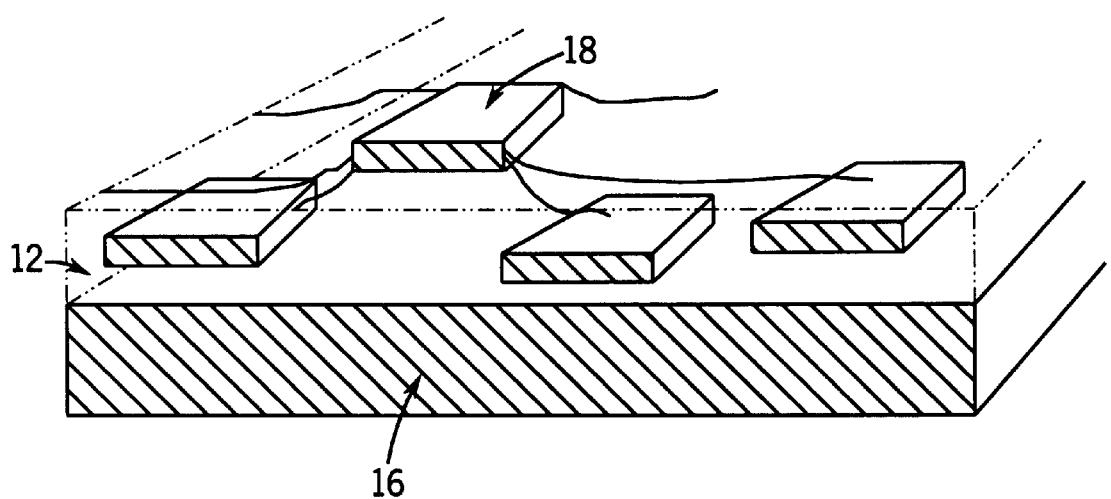
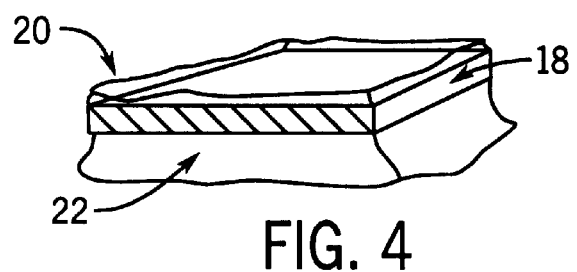
FIG. 4

LABEL ADHESIVE WITH DISPERSED REFRACTIVE PARTICLES

CROSS REFERENCE TO RELATED APPLICATION

This application is based on provisional patent application Ser. No. 60/127,639, filed Apr. 2, 1999.

FIELD OF THE INVENTION

The present invention relates to adhesives generally, and more specifically to an adhesive composition containing small particles of prismatic or holographic film and the method of manufacturing that adhesive for the purpose of creating new and unique adhesive products used in decorative and tamper-indicating applications.

BACKGROUND OF THE INVENTION

Self-adhering labels have become very popular for use in the decoration, general-purpose marking and identification of manufactured objects. Also referred to as "stickers" or "decals", the use of these labels continues to grow with more demand being placed upon the design and manufacture of the label material to provide increasingly unique and complex structures. As a result, labels are now printed with one or more types of eye-catching graphics in order to capture consumer attention and create a unique product image.

Holographic or prismatic materials are extensively used as label stock to attract attention with dazzling reflections of refracted light bouncing off the embossed patterns in the material surface. One industry in which these labels are heavily used is the beverage industry wherein the labels may be placed over the exterior of glass or polyester (PET) bottles. Furthermore, the cosmetic food and pharmaceutical industries also place a high value on eye-catching and attractive labeling of their goods.

The visual complexity of these materials has also been exploited to create labels and other marking media that provide evidence of counterfeiting or tampering with the objects on which labels are placed. The tamper-evident nature of prismatic or holographic media rising from the inherent difficulty in copying them also favors their inclusion in these types of labeling materials.

However, one problem with the typical prismatic materials used to form the above-mentioned labels is that the materials tend to be opaque since they are metallic in appearance. The opaqueness of the material detracts from the ability of a consumer to see the contents of the object through the label when placed on the object. Therefore, it is desirable to use a prismatic material to decorate an object that retains some clarity so that one may see through the label and into the contents of the object.

Furthermore, a second problem with prior art material labels arises with respect to the way that the labels are made. Prior art prismatic labels are normally formed entirely of a prismatic film or may include only a section of prismatic material placed on the label by way of stamping a predetermined area of the label with a prismatic or holographic foil. The prismatic materials used to form these labels tend to be expensive due to the multiple-step processes used in producing the embossed and metallized film that will eventually be converted into individual labels.

Therefore, it is desirable to develop an alternative label construction or adhesive composition for use in creating labels for various objects that incorporates some prismatic features to provide a striking, distinctive appearance to the object at a reduced cost, which is also substantially transparent or clear to enable a consumer to view the contents of the object through the label.

SUMMARY OF THE INVENTION

It is an object of the present invention to provide an adhesive composition and a laminate construction employing the composition that includes an amount of platelets or particles of prismatic or holographic material to give the composition a prismatic appearance.

It is further object of the present invention to provide an adhesive composition in which the platelets or particles have a configuration that enables the platelets to position themselves parallel to a surface on which the composition is applied in order to maximize the prismatic effect of the platelets while allowing the composition to remain substantially clear.

It is still a further object of the invention to provide an adhesive composition capable having a highly prismatic or holographic appearance that is inexpensive to manufacture and use in forming various types of laminate compositions, such as labels.

The present invention is an adhesive formulation including a clear, optically transparent adhesive layer that contains a number of thin, generally opaque prismatic or holographic particles or platelets randomly, but evenly, dispersed throughout the adhesive layer. The platelets serve to refract light striking them to give the adhesive a colorful, distinctive and consistent appearance. The adhesive layer containing the platelets is extruded in a thin and continuous layer that is laminated onto a clear film. The adhesive layer is preferably a pressure sensitive adhesive to facilitate the instantaneous bonding of the laminate to the surface of an object. The laminated construction formed by the adhesive and the film is preferably cut into individual sections to form labels that may be applied to a surface by pressing the adhesive portion of the laminate against the surface. The individual laminate sections provide a decorative effect to the objects on which they are applied whereby the platelets reflect light back towards an observer in a prismatic dispersion of color. Furthermore, should a laminate including the adhesive composition be tampered with after being placed on an object, the prismatic platelets will shift and form voids or bubbles in the configuration of the platelets in the composition, providing evidence of a counterfeit object or of tampering with the laminate.

The present invention may take various forms and can be made by employing different techniques to achieve similar end products. A preferred embodiment is hereinafter described to enable one of ordinary skill in the art to understand and reproduce the same. Furthermore, it may be apparent to one of ordinary skill in the art that certain improvements may be made to the present invention and its application that are not specifically stated herein. Therefore, the preferred embodiment described herein is only intended to be illustrative of the present invention and should not be construed to limit the scope of the invention as claimed.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a cross-sectional, isometric view of a laminate construction similar to FIG. 1 showing a platelet located adjacent or protruding through the surface of the adhesive composition; and FIG. 4 is an isometric view of a platelet removed from the laminate construction and covered with adhesive layers above and below the platelet.

DETAILED DESCRIPTION OF THE INVENTION

Figure 1:
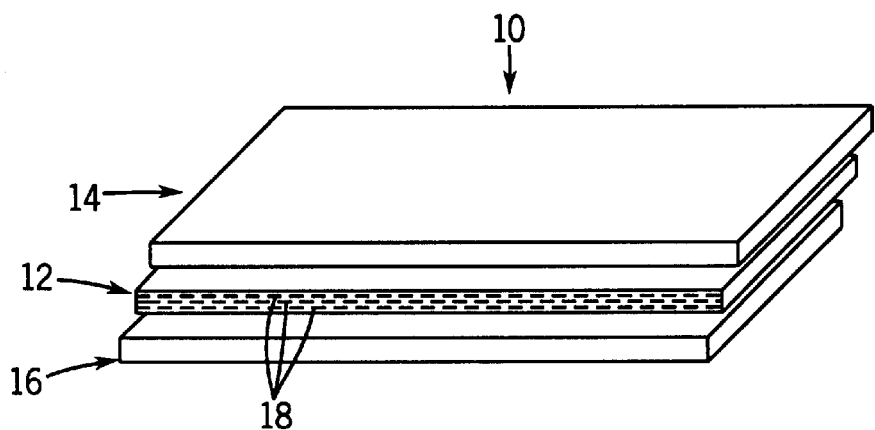
FIG. 1 is a cross-sectional, exploded view of a laminate construction including the adhesive composition of the present invention.
Figure 2:
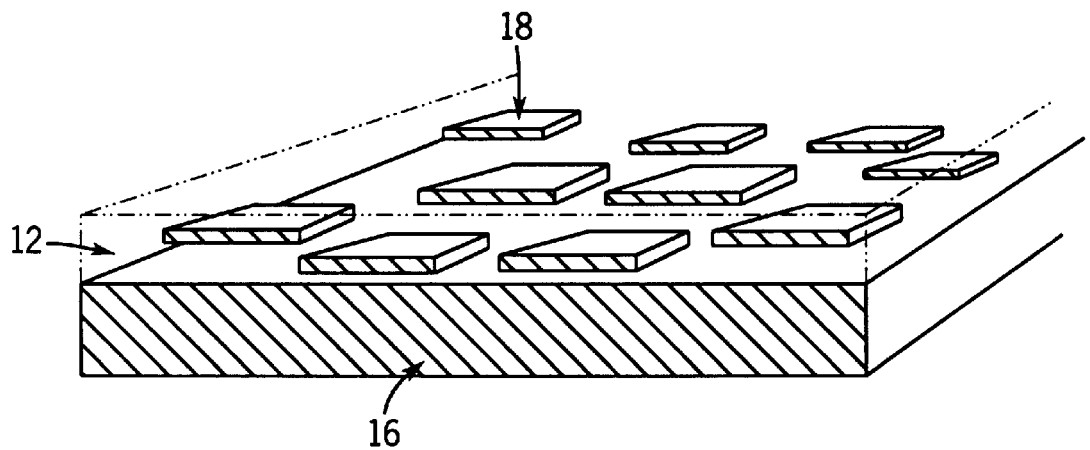
FIG. 2 is a cross-sectional, isometric view of the laminate construction of FIG. 1 showing the arrangement of the releasable substrate, the adhesive composition and the platelets in the composition.

Wherein like reference numerals designate like parts throughout the disclosure, in one aspect of the invention, the present invention is an adhesive composition indicated by 12 in FIG. 2 for use in a variety of adhesive applications. In another aspect of the invention, the adhesive composition 12 is a portion of a decorative laminate construction 10 shown in FIG. 1 that can be cut into individual labels which may have printed images or other indicia present on the labels. The laminate construction 10, best shown in FIG. 1, is comprised of a generally clear film 14 that has the substantially transparent adhesive composition 12 on one side of the film 14. The adhesive composition 12 bonds the film 14 to the surface on which the film 14 is placed. The adhesive composition 12 also contains a number of prismatic platelets 18 that provide the striking decorative appearance to the laminate construction 10. A releasable substrate 16 is placed over the adhesive composition 12 opposite the film 14 to cover and protect the adhesive during transport. Substrate 16 prevents the adhesive composition 12 from bonding with any surface until the substrate 16 is removed and the adhesive is applied to the surface of an object (not shown) that is to be decorated or labeled with the film 14.

In the present invention, any polymeric medium can be used to form the adhesive composition 12 for the laminate construction 10 as long as the medium is able to bond to the surface of an object and is also substantially clear in its final form.

Examples of suitable types of adhesive mediums would include rubber-based mixtures, silicone polymers, acrylics, polyesters, and polyurethanes that are sufficiently tacky to function in the desired adhesive manner. These types of adhesives can be obtained from a number of adhesive manufacturers such as Rohm & Haas, Solutia, National Starch & Chemical and Ashland Chemical. For the purposes of the present invention, the preferred polymeric medium is a pressure sensitive adhesive selected from this group. Both solvent-borne and water-based pressure sensitive adhesives may be used, provided the adhesive chosen displays the properties desired in a general pressure sensitive adhesive. These properties include adequate adhesion to the surface of the object and adequate cohesion to maintain the bond between the surface and the adhesive for an extended period of time. Most preferably, the polymeric medium is a pressure sensitive water borne acrylic, known as an emulsion acrylic. These adhesives tend to be half water and half polymer suspended or emulsified into the water portion. This medium is also preferred for its ability to coat easily into a smooth and continuous layer before drying. Another desirable property of the adhesive is its propensity to bond strongly with the clear film 14 that will eventually form the laminate construction 10.

To form the adhesive coating, the platelets 18 are mixed with the adhesive while the adhesive is in a liquid state. The ratio of the amount of the adhesive to the amount of the platelets added to the adhesive may range from 100 parts adhesive to 0.25 parts platelets, up to 100 parts adhesive to 10 parts platelets. More preferably, the ratio is between 100 parts adhesive to 0.5 parts platelets and 100 parts adhesive to 2 parts platelets. Using a larger amount of platelets, i.e., above 2.0 parts platelets per 100 parts adhesive, increases the probability that the platelets 18 will stack upon each other in the composition 12 when the adhesive composition 12 is extruded to form the laminate construction 10. Any such stacking of the platelets 18 will result in an uneven or bumpy surface for the finished adhesive composition 12 that will appear somewhat opaque and lessen the aesthetically pleasing appearance of the laminate construction 10. Stacking also results in an inefficient use of the platelets 18 because each platelet 18 in the adhesive composition 12 is not able to add to the overall refractive effect of the adhesive composition 12. This occurs because the platelets 18 are in close proximity with each other, interfering with the refraction from other platelets 18 and giving the appearance of a continuous prismatic film to the construction 10. Therefore, to optimize the aesthetically pleasing qualities of the finished construction 10, small amounts of the platelets 18 are added at specific intervals when forming the adhesive composition 12 to allow the previously added platelets to disperse in the adhesive 12. This process gives an appearance of consistent spacing to the platelets 18 in the composition 12 while leaving the majority of the adhesive composition 12 to remain transparent. To best accomplish this, a ratio of 100 parts adhesive to 1 part platelets is most preferred.

The platelets 18 used in the present invention are obtained from Spectratek Technologies, Inc. of Los Angeles, Calif. The trade name of the platelet particles is Geometric Pigments. These platelets are made from embossed, aluminized polyester film that has been communed into very small pieces. The platelets come in a range of colors, sizes, and thicknesses. For the purposes of the present invention, a preferred platelet size has each side measuring approximately 100 microns and a thickness of about 9 microns. An alternate preferred platelet size measures about 200 microns on each side and has a thickness of about 12 microns. The preferred platelet has a silver appearance, but has been embossed with a diffraction grating that splits incoming white light into the colors of the visible spectrum. Platelets having a different base color, such as gold, copper or pewter, may also be utilized to generate a shift in the overall color of the defracted and reflected light. Pre-tinted particles are also available that can restrain the spectral change to a very narrow range of colors such as blue to blue-green, green to greenish-yellow, red to orange, etc. Furthermore, the size and thickness of the platelet may vary further with the thickness of the adhesive composition 12 on the film. Adjusting the platelet size in accordance with the thickness of adhesive composition 12 will allow the platelets 18 to be completely contained within the adhesive composition 12. This will prevent the platelets 18 from creating any texture on the exterior surface of the adhesive composition, as the platelets 18 will not protrude from the exterior surface of the adhesive composition 12 when extruded onto the film 14.

To mix the platelets 18 with the adhesive composition 12, the adhesive is weighed to determine the total solids content and placed in a vessel sufficiently large to hold the amount of adhesive. The adhesive composition 12 is then stirred with a small mixing blade using just enough force to create a vortex in the adhesive. The platelets 18 are then added in generally equal portions at selected time intervals to allow the previously added portion to disperse throughout the adhesive. The number of portions added to the adhesive will depend on the amount of solids present in the adhesive and ratio of solids to platelets necessary to obtain the desired appearance for the laminate construction 10. Mixing continues for thirty minutes after adding the last portion of the platelets 18, and the adhesive composition 12 containing the platelets 18 is ready to be coated or extruded into a thin layer on a suitable substrate 16.

The adhesive composition 12 containing the platelets 18 can be applied to the substrate 16 in any of a number of techniques that are known in the art. These techniques include a reverse gravure technique, a slot die, a reverse roll and a Meyer rod. The releasable substrate 16 is normally pre-coated with a releasing agent (not shown) on one side to allow the substrate 16 to be easily removed from the adhesive composition 12. The substrate 16 may be formed of various types of materials, such as polyethylene, polyester papers, or a combination of the two and the releasing agent present on the substrate 16 can be selected from silicone, teflon, carbamate or polyethylene.

The substrate 16 comes as a continuous roll of material significantly longer than it is wide. The substrate 16 is placed on and unrolled through a coating machine (not shown) and the adhesive composition 12 is applied to it in a continuous, smooth and uniform layer using one of the above-mentioned methods. In a representative embodiment, adhesive composition 12 is applied at the rate of 12 to 18 pounds of adhesive composition per 3,000 square feet of substrate 16. The coated substrate 16 then passes into a drying tunnel typically filled with blown, heated air in order to remove the carrier fluid from the adhesive composition 12 in a short period of time. As the carrier fluid is removed, the adhesive solids coalesce into a dried polymer layer. The platelets 18 are retained in the layer of adhesive composition 12 during this drying period and become aligned parallel with the substrate 16, as shown in FIG. 2.

When extruded onto the substrate, the prismatic platelets 18 will level themselves in the major plane of the adhesive composition 12 generally parallel to the substrate 16. This action of leveling is created by the planar form of platelets 18 and the hydrodynamic resistance forced upon each platelet 18 at the moment of passing through a gap or metering opening in the extrusion process. The platelets 18 align themselves in the direction of the fluid to present the lowest amount of resistance. The small particle size of platelets 18 allow platelets 18 to pass through orifices or metering gaps commonly used in extrusion processes. The self-leveling of these particles during extrusion results in the platelets 18 being laid flat in the major plane of the finished adhesive. The effect is beneficial for thin films of adhesive since all of the platelets 18 present a reflective surface that is substantially perpendicular to most viewing angles. The unique ability of the prismatic platelets 18 to reflect light at many angles presents a constantly changing image as the line of sight for the viewer is changed. The overall effect is best described as a myriad of small, bright reflections, similar to the radiant sparkle of crystals, crushed glass or even the twinkle of starlight. As the viewer's line of sight moves across the coated and finished adhesive composition 12, a color shift is apparent such as blue to green to yellow or red to orange to yellow.

The thickness of the adhesive composition 12 after drying is important in achieving a consistent and aesthetically pleasing material. The adhesive composition 12 is deposited so that its final dried thickness is greater than that of any individual platelet 18. As shown in FIG. 3, if the adhesive composition 12 is too thin, a platelet 18 can protrude through the upper surface of the adhesive composition 12 when laminating the adhesive composition 12 to the substrate 16. In this situation, an air bubble (not shown) is trapped around the platelet 18 and when the laminate construction 10 is made into a decorative label, this bubble is highly visible in the finished label, which is an unacceptable result. Therefore, because the minimal deposition of a typical adhesive composition 12 needed to embed the platelets 18 is 22–26 grams per square meter, which provides an average thickness of 20–22 microns, a coating weight or thickness equal or greater than these amounts is required to prevent platelets 18 from becoming embedded during the drying process and protruding through the upper surface of the adhesive composition 12.

Upon exiting from the drying tunnel, the substrate 16 and adhesive composition 12 are then laminated to a clear film 14 such that the adhesive composition 12 contacts one side of the film 14. Many clear polymeric films can be used including films formed of polyethylenes, polypropylenes, polyesters, polystyrenes and vinyls. The film is a preferably clear polymer film, such as Mobil Chemical 2.0 mil biaxially oriented propylene. However, the film may also be a slightly opaque polymer, such as Avery Dennison 2.5 matte/clear polyolefin sold by Avery Engineered Films Division. Furthermore, films that have been tinted in various colors may also be utilized, but the tinting on these films 14 will reduce the number of colors that are reflected back by the platelets 18 through the film 14. The resulting laminate construction 10 is passed through compression rollers that complete the intimate bonding of the adhesive composition 12 to the film 14.

After the film 14 is laminated over the adhesive composition 12 opposite the substrate 16, the resulting laminate construction 10 is converted into individual labels by running the laminate construction 10 underneath a rotary die that cuts the laminate construction 10 into the desired shapes. After cutting the laminate construction 10 into the labels, the unused portion of the laminate construction 10 is removed, leaving behind the individual labels. The labels may be printed with logos, images, foils, or other information as desired, either before or after cutting. In this form, the labels may be applied to the surfaces of objects such as packaging containers, bottles, boxes, and the like, by removing the releasable substrate 16 from the laminate construction 10 and placing the adhesive composition 12 against the object to present a pleasing and eyecatching look for the object.

The phenomena of the platelets 18 lying flat in the major plane of the adhesive composition 12, essentially suspended within the thin layer of adhesive composition 12, can also be exploited for the purposes of creating an anti-counterfeit or tamper-indicating label. The laminate construction 10 of the present invention will become irreparably altered when it is removed from the surface of an object to which it is attached. This alteration occurs within the adhesive composition 12 during removal because some of the platelets 18 have a relatively thin layer 20 of adhesive composition 12 above them, as shown in FIG. 4. When this arrangement occurs, the thin adhesive layer 20 above the platelet 18 will have a weaker bonding strength than the thicker layer 22 below the platelet 18. During removal of the laminate construction 10 from the object, these platelets 18 will preferentially break away from the surrounding adhesive composition 12 and remain bonded to the object. These platelets 18 and adhesive composition 12 bonded to the object are difficult to remove from the surface of the object due to the strength of the bond between the adhesive composition 12 and the object, such that the evidence of removal of the laminate construction 10 is not readily concealed.

Furthermore, the laminate construction 10 will now have voids (not shown) in the adhesive composition 12 where the platelets 18 bonded to the object were previously located. If the removed laminate construction 10 were to be re-applied to another object, the voids would be obvious as flaws in the overall appearance of the laminate. These flaws manifest themselves as air bubbles or blisters that appear silvery-white and much larger than the platelets 18 themselves.

In another embodiment of the laminate construction 10 of the present invention, the adhesive composition 12 is extruded onto the releasable substrate 16 opposite the releasing agent and dried as previously discussed. The releasable substrate 16 including the dried adhesive composition 12 is then wound about a take-up roll. From this roll, the adhesive composition 12 and releasable substrate 16, or overlaminate, can be unrolled as is known in the art for application to a web of printed material (not shown), such as pre-printed labels. In this arrangement, the overlaminate is applied to the web of pre-printed labels before the labels are die-cut to provide a protective layer over the graphics printed on the labels.

In still another embodiment of the present invention, the adhesive composition 12 may be extruded between a pair of releasable substrates to form a transfer adhesive (not shown). In this arrangement, the adhesive composition 12 contacts a side of each releasable substrate that has been coated with a releasing agent. The transfer adhesive may then be applied to a label that has printing on both sides of the label material by removing one of the substrates to allow the adhesive to be affixed to one surface of the label. The label may then be applied to a surface of a clear container, such as a glass bottle. Due to the generally transparent nature of the adhesive coating in the transfer adhesive, when the label is applied to the surface of a clear container, a person may view the printed material on the interior surface of the label through the container and through the adhesive coating between the label and container.

Various alternatives and embodiments are contemplated as being within the scope of the following claims particularly pointing out and distinctly claiming the subject matter regarded as the invention.

I claim:

1. A decorative adhesive composition comprising:
   a generally transparent adhesive, the adhesive being formed of a polymeric medium capable of bonding to a surface of an object; and
   a number of refractive platelets embossed with a diffraction grating contained within the adhesive, wherein the quantity of the platelets is such that the adhesive with the refractive platelets therein is generally transparent.

2. The decorative adhesive composition of claim 1 wherein the adhesive is a pressure sensitive adhesive.

3. The decorative adhesive composition of claim 2 wherein the polymeric medium is selected from the group consisting of acrylics, rubber-based mixtures, silicone polymers, polyesters, and urethanes.

4. The decorative adhesive composition of claim 1 wherein the amount of platelets contained in the adhesive ranges from a ratio of 100 parts adhesive to 10 parts platelets, to a ratio of 100 parts adhesive to 0.25 parts platelets.

5. The decorative adhesive composition of claim 4 wherein the amount of platelets contained in the adhesive ranges from a ratio of 100 parts adhesive to 0.5 parts platelets to 100 parts adhesive to 2 parts platelets.

6. The decorative adhesive composition of claim 5 wherein the platelets are present in the adhesive in a ratio of 100 parts adhesive to 1 part platelets.

7. The decorative adhesive composition of claim 1 wherein the platelets are formed from aluminized polyester film.

8. The decorative adhesive composition of claim 7 wherein the platelets have a thickness between about 9 to 12 microns.

9. The decorative adhesive composition of claim 7 wherein the platelets are generally square-shaped or hexagonal with each side having a length ranging between about 50 to 100 microns.

10. A decorative laminate construction comprising:
    a first substrate including a releasing agent on one side;
    a generally transparent decorative adhesive formed of a polymeric medium placed onto the first substrate over the releasing agent;
    a number of refractive platelets embossed with a diffraction grating contained within the adhesive; and
    a second substrate placed over the adhesive opposite the first substrate, the second substrate being substantially clear;
    wherein the refractive platelets are present in a quantity such that the adhesive with the refractive platelets therein is generally transparent.

11. The decorative laminate of claim 10 wherein the first substrate is formed of a material selected from the group consisting of polyester, polystrene, polyethylene, polypropylene, and vinyl.

12. The decorative laminate of claim 10 wherein the second substrate includes a releasing agent on the side positioned against the adhesive.

13. The decorative laminate of claim 10 wherein the first and second substrates are formed of a film with a releasing agent applied to at least one side.

14. The decorative laminate of claim 10 wherein the second substrate includes printed matter on a side opposite the adhesive.

15. The decorative laminate of claim 14 wherein the second substrate is formed of a substantially clear film.

16. The decorative laminate of claim 15 wherein the clear film is formed of a material selected from the group consisting of polyester, polystyrene, polyethylene, polypropylene, polyolefm, propylene and vinyl.

17. The decorative laminate of claim 15 wherein the laminate is cut to form a plurality of labels.

18. The decorative laminate of claim 10 wherein the releasing agent is selected from the group consisting of silicone, teflon, carbamate, and polyethylene.

19. The decorative laminate of claim 10 wherein the adhesive is a pressure sensitive adhesive.

20. The decorative laminate of claim 19 wherein the polymeric medium is selected from the group consisting of waterborne or solventbome acrylics, rubber-based mixtures, silicones, polyesters, and polyurethanes.

21. The decorative laminate of claim 10 wherein the platelets are formed from aluminized polyester film.

22. A method for forming a decorative laminate construction for application to a surface of an object comprising the steps of:
    mixing a number of refractive platelets embossed with a diffraction grating into a generally transparent polymeric adhesive in liquid form to disperse the platelets within the adhesive, wherein the quantity of refractive platelets is such that the adhesive with the refractive platelets therein is generally transparent;

extruding the adhesive containing the platelets onto a first substrate, the first substrate having a releasing agent applied to one side onto which the adhesive is extruded;

drying the adhesive on the first substrate;

applying a second substrate to the adhesive opposite the first substrate to form a laminate construction; and cutting the laminate construction into a number of desired shapes.

23. The method of claim 22 further comprising the step of printing images on the second substrate.

24. The method of claim 22 wherein the second substrate includes printed images on one side over which the adhesive and first substrate are placed.

25. The method of claim 22 wherein the second substrate includes a releasing agent applied to one side that is positioned against the adhesive.

26. The method of claim 22 wherein the adhesive is a pressure sensitive adhesive.

27. The method of claim 26 wherein the polymeric medium is selected from the group consisting of waterborne or solventborne acrylics, rubber-based mixtures, silicones, polyesters, and polyurethanes.

28. The method of claim 22 wherein the second substrate is formed of a substantially clear film.

29. The method of claim 28 wherein the clear film is formed of a material selected from the group consisting of polyester, polystyrene, polyethylene, polypropylene, propylene, polyolefin and vinyl.

30. The method of claim 22 wherein the first substrate is formed of a material selected from the group consisting of polyester, polystyrene, polyethylene, polypropylene and vinyl.

31. The method of claim 22 wherein the releasing agent is selected from the group consisting of silicone, teflon, carbamate and polyethylene.

32. The method of claim 22 wherein the platelets are formed from aluminized polyester film.

* * * * *